UNITED STATES PATENT OFFICE.

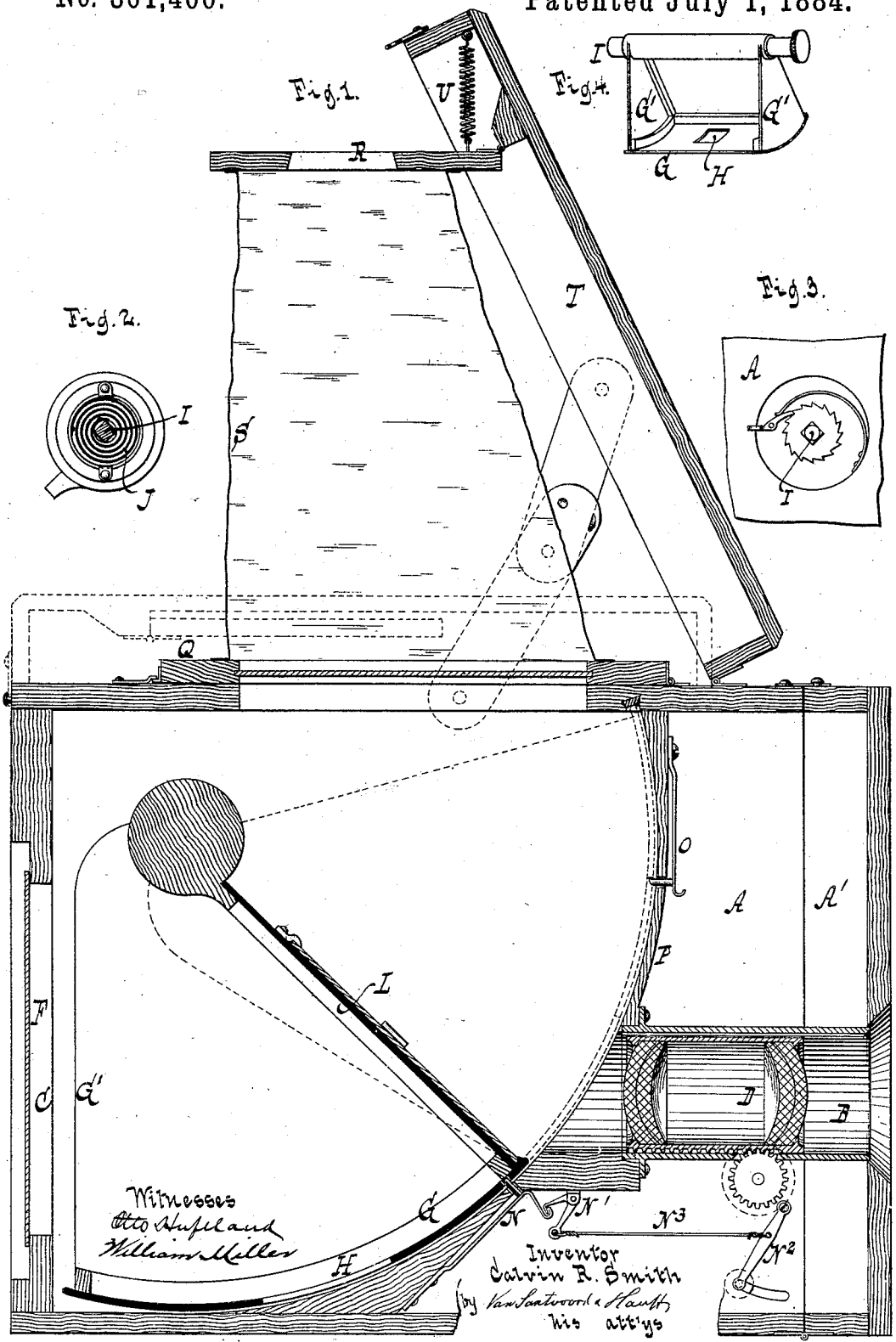

CALVIN RAE SMITH, OF NEW YORK, N. Y.

PHOTOGRAPHIC CAMERA.

SPECIFICATION forming part of Letters Patent No. 301,400, dated July 1, 1884.

Application filed April 17, 1884. (No model.)

*To all whom it may concern:*

Be it known that I, CALVIN RAE SMITH, a citizen of the United States, residing at New York, in the county and State of New York, have invented new and useful Improvements in Photographic Cameras, of which the following is a specification.

This invention relates to that class of cameras which are designed especially for taking instantaneous photographs; and it consists in the novel features of construction hereinafter described, whereby an article of superior utility is obtained.

In the accompanying drawings, Figure 1 is a vertical longitudinal section of a camera embodying my invention. Figs. 2, 3, and 4 are detail views of parts.

Similar letters indicate corresponding parts.

The letter A designates the camera-box, having openings B C in opposite sides thereof—one to receive the lens D, and the other the sensitive plate F—the lens or its holder being made adjustable through the medium of a rack and pinion in a well-known manner. Adjacent to the lens-opening B, within the box, is located a swinging shutter, G, having an exposure-opening, H, which is adapted to register with the lens-opening B—that is to say, in the motion of the shutter this opening passes and repasses the lens-opening—and since the plate inserted in the plate-opening is thus exposed to the lens the desired effect is produced. The shutter G is mounted on an axial spindle, I, by means of end pieces, G', (best seen in Fig. 4,) which are flat and are fitted close to the proper sides of the box, to prevent the passage of light between them and such sides. The spindle I has its bearings in the sides of the box, and on it is arranged a spring, J, to act thereon with a tendency to force the shutter G from the lower position (shown in Fig. 1) to the upper position, (indicated by dotted lines in such figure,) and consequently when the shutter is allowed to follow the action of this spring the exposure-opening H passes the lens-opening B with a motion more or less rapid, according to the tension of the spring, and an instantaneous exposure is produced, the lens-opening being closed by the shutter, except when the exposure-opening is opposite to it. In the lower position of the shutter the lens-opening B is entirely exposed, and the image in the focus of the lens is reflected upon the lower surface of a ground glass plate, K, in the top of the box by means of a mirror, L, or a prism, so that the image is visible to the eye through the glass, and the operator is enabled to adjust the lens in the required manner, the mirror being arranged on the shutter G to take an inclined position in relation to the lens-opening and to the focusing-glass K when the shutter is moved to a lower or opened position, as shown in Fig. 1. The shutter G is held in an opened position by means of a catch, N, which is arranged to engage the shutter when it reaches the position named, this catch being provided with means for retracting it, consisting, in this example, of levers N' N², which are connected together by means of a link, N³, and one of which is connected to the catch, while the other is connected to a finger-button on the outside of the box. A second catch, O, is used to engage the shutter when the exposure-opening H registers with the lens-opening B, and to hold the shutter in that position for making a time-exposure, both catches entering one and the same opening of the shutter, and the catch O being arranged to take an inoperative position and leave the camera in condition for instantaneous work. Both catches N O, moreover, are attached to a partition, P, serving to divide the shutter G from the side A' of the box, which side thereof is loose, and is hinged to form a door, through which access may be had to the catches and other inclosed parts.

The focusing-glass K is fitted in a frame, Q, on the top of the box, and above it is located an eye-piece, R, which is connected to the box by means of a bellows or hood, S, of opaque material—such as rubber cloth—and which is hinged to a lid, T, which in turn is hinged to the top of the box above the focusing-glass, so that when this lid is closed it covers the focusing-glass and eye-piece, together with the bellows, the parts last named being folded under it. When the lid T is opened, the eye-piece R is unfolded and held in a horizontal position, which is its normal position, by means of a spring, U, connecting the eye-piece to the lid.

What I claim as new, and desire to secure by Letters Patent, is—

1. The combination, substantially as hereinbefore described, of the camera-box having a lens-opening and plate-opening in opposite sides and a focusing-glass in the top, the swinging shutter adjacent to the lens-opening having an exposure-opening to register therewith, and the mirror arranged on the shutter to reflect the image in the focus of the lens on the focusing-glass when the shutter is moved to an opened position.

2. The combination, substantially as hereinbefore described, of the camera-box having a lens-opening and a plate-opening in opposite sides and a focusing-glass in the top, the swinging shutter adjacent to the lens-opening having an exposure-opening to register therewith, the mirror arranged on the shutter to reflect the image in the focus of the lens on the focusing-glass when the shutter is moved to an opened position, the axial spindle of the shutter, the spring arranged on the spindle to force the shutter from an opened to a closed position, and the catch arranged to engage the shutter in its opened position.

3. The combination, substantially as hereinbefore described, of the camera-box having a lens-opening and plate-opening in opposite sides and a focusing-glass in the top, the swinging shutter adjacent to the lens-opening having an exposure-opening to register therewith, the mirror arranged on the shutter to reflect the image in the focus of the lens on the focusing-glass when the shutter is moved to an opened position, and the catch arranged to engage the shutter when its exposure-opening registers with the lens-opening.

4. The combination, substantially as hereinbefore described, of the camera-box having a lens-opening and plate-opening in opposite sides and a focusing-glass in the top, and having the side containing the lens-opening made in form of a door, the swinging shutter adjacent to the lens-opening having an exposure-opening to register therewith, the mirror arranged on the shutter to reflect the image in the focus of the lens on the focusing-glass when the shutter is moved to an opened position, and the partition dividing the shutter from the door of the box.

5. The combination, substantially as hereinbefore described, of the camera-box having a lens-opening and plate-opening in opposite sides and a focusing-glass in the top, the swinging shutter adjacent to the lens-opening having an exposure-opening to register therewith, the mirror arranged on the shutter to reflect the image in the focus of the lens on the focusing-glass when the shutter is moved to an opened position, the lid hinged to the box above the focusing-glass, the eye-piece hinged to the lid, the opaque bellows connecting the eye-piece to the box above the focusing-glass, and the spring connecting the eye-piece to the lid.

In testimony whereof I have hereunto set my hand and seal in the presence of two subscribing witnesses.

CALVIN RAE SMITH. [L. S.]

Witnesses:
  CHAS. WAHLERS,
  E. F. KASTENHUBER.